US006875948B2

(12) United States Patent
Gobez et al.

(10) Patent No.: US 6,875,948 B2
(45) Date of Patent: Apr. 5, 2005

(54) METHOD AND DEVICE FOR CONTROLLING THE WELDING BY FLASH WELDING OF TWO METALLIC PARTS

(75) Inventors: Pascal Gobez, La Talaudiere (FR); Afchine Nasserian, Courbevoie (FR); Marc Valence, Courbevoie (FR)

(73) Assignee: Vai Clecim, Saint Chamond (FR)

( * ) Notice: Subject to any disclaimer, the term of this patent is extended or adjusted under 35 U.S.C. 154(b) by 0 days.

(21) Appl. No.: 10/378,666

(22) Filed: Mar. 5, 2003

(65) Prior Publication Data

US 2003/0196991 A1 Oct. 23, 2003

(30) Foreign Application Priority Data

Mar. 5, 2002 (FR) ............................................. 02 02798

(51) Int. Cl.⁷ .............................................. B23K 11/04
(52) U.S. Cl. ........................ 219/100; 219/101; 219/104
(58) Field of Search .......................... 219/97, 100, 104, 219/101, 110

(56) References Cited

U.S. PATENT DOCUMENTS

| | | | |
|---|---|---|---|
| 4,044,219 A | | 8/1977 | Lebedev et al. |
| 4,084,075 A | * | 4/1978 | Deffenbaugh ................. 219/97 |
| 4,376,242 A | * | 3/1983 | Buff et al. ..................... 219/97 |
| 4,383,162 A | * | 5/1983 | Ellis ............................ 219/100 |
| 4,733,044 A | * | 3/1988 | Kuchuk-Yatsenko et al. .... 219/100 |
| 6,429,398 B1 | | 8/2002 | Legoupil et al. |

FOREIGN PATENT DOCUMENTS

| | | |
|---|---|---|
| EP | 0 334 969 | 9/1988 |
| EP | 0 413 821 A1 | 2/1989 |

* cited by examiner

*Primary Examiner*—Clifford C. Shaw
(74) *Attorney, Agent, or Firm*—Arent Fox, PLLC

(57) ABSTRACT

The invention concerns a method for controlling the butt welding, by flash welding, of two metallic parts (A, A') in a welding machine of the type comprising two pairs of clamping dies (2, 2') mounted respectively on a fixed frame (1) and on a mobile frame (1') for contacting rear (3) and front (3') ends of both parts (A, A') and the flow of an electric welding current.

According to the invention, on the one hand a set of electric parameters including at least the voltage ($U_s$) and the intensity ($I_s$) of the welding current and on the other hand the relative position of the mobile frame (1') with respect to the fixed frame (1) are measured at any moment and the travel of the mobile frame (1') is regulated in position from at least one of the measured value of said electric parameters, in order to control the closing-in speed v(t) of the ends (3, 3') of both parts (A, A') taking in account the progress of the welding process, during at least a portion thereof.

16 Claims, 3 Drawing Sheets

METHOD AND DEVICE FOR CONTROLLING THE WELDING BY FLASH WELDING OF TWO METALLIC PARTS

The invention concerns a method for controlling the butt welding process of two metallic parts, in particular two sheets in the form of bands running after one another along a longitudinal axis and also covers a device for controlling, according to said method, the operation of a flash welding machine.

In metallurgical plants, in particular for producing metallic bands, if is often necessary to connect two successive bands, for instance to form sheet metal coils of great length from shorter coils or, still, to connect sheets from different coils and intended to be treated in continuous metallurgical transformation plants such, for instance, etching, rolling or galvanisation lines. The welding machines used to this end must be especially suited to the purpose set. For instance, the rear and front ends of two successive bands may be applied over one another and weld together by injecting an electric current between two knurling wheels moving transversally. However, there is then an excessive thickness, which must be avoided in numerous cases.

It is, therefore, often necessary to butt weld both bands. To do so, both two ends, respectively rear and front of both bands, must be shorn along two lines perfectly parallel, then brought closer to one another to contact the opposite edges, between which is applied an electric voltage which, in so-called flash welding machines, can be relatively low.

Indeed, there are necessarily, along the shorn edges of both parts, irregularities which, when bringing shorn edges closer to one another, determine a series of micro-contacts spread along the junction line and each producing a micro-short-circuit wherein circulates a high intensity current. In each short-circuit zone, the metal forming the short-circuit bridge becomes liquid. A drop of molten metal is then ejected under the effect of electromagnetic forces while generating a spark, but the zone surrounding the location of the short-circuit bridge has heated up considerably.

Since the short-circuit bridges are spread all along the contacting edges, the ends of both bands are then heated at high temperature, over their whole width.

When both parts have been heated up to sufficient temperature, they are applied on one another while exerting high pressure which determines a mutual penetration of the contacting ends, on either side of the junction line, while initiating the welding by a kind of forging.

This method of so-called flash welding is well known and does not require any detailed explanations.

A flash welding machine must therefore fulfil various functions. Indeed, the following steps must be performed in succession: positioning the ends of both bands which are clamped between both pairs of dies, shear two parallel edges, contacting them and injecting the current to heat the ends of both bands at the required temperature, and, finally, applying them relatively violently against one another, to generate the forging effect required. This forging generates, usually, a kind of flange which, after cooling-down, must be planed off to confer constant thickness to the product.

Generally speaking, a flash welding machine comprises therefore two pairs of clamping dies of the ends of both parts to be welded, forming two chucks mounted respectively on a fixed frame and on a mobile frame, an electric welding circuit comprising an electric power supply source with two poles connected respectively to both pairs of clamping dies and means for controlling the travel of the mobile frame towards the fixed frame, comprising, usually, one or several hydraulic jacks, for bringing together and contacting the edges to be welded.

A machine of this type is described in detail, for instance in the French patent n° 2756504 which covers a particular embodiment enabling to perform on a unique machine the shearing, welding and planing operations of the welded bead. But other types of machine are known including, similarly, a mobile chuck and a fixed chuck, means for adjusting cantilever distances and means for closing-in shorn edges.

The clamping chucks which include each a pair of dies placed on either side of the band, exhibit high thermal inertia and may well absorb the heat developed by flash welding.

In order to heat the end of each band at the requested temperature, it is necessary to leave, between the shorn edge and the corresponding end of the chuck, a free distance, called cantilever distance, which must be determined according to criteria which might be contradictory.

Indeed, a certain quantity of metal is using during the flash welding process, since, as we have seen already, the short-circuit bridges which determine the heating intensity cause the ejection of metal drops. The cantilever length must therefore allow for this consumption of metal.

Still, the bands to be welded have relatively small thickness and, taking into account the necessary cantilever length, there exists a risk of buckling of the ends thereby causing deformations and poor welding.

Consequently, the cantilever distances must be calculated as precisely as possible.

Besides, during forging, it is necessary, on the one hand, to avoid too sudden closing-in liable to cause the buckling of the cantilever portions and, on the other hand, to stop the movement against a limit stop in order not to exceed the heated cantilever length for forging. But sudden stop against a limit stop causes a rebound which is detrimental to the quality of the welding since it exerts short traction on the welding which has just been made.

All these phenomena depend on features of the parts to be welded, in particular their thickness and the composition of the metal.

Such machines must therefore be operated by experienced staff, capable to control the operation of the machine while monitoring the performance conditions of the welding.

To solve these problems, various systems have been suggested, enabling to control automatically the travels of the parts to be welded, at least for certain steps of the welding process.

For example, since the travel of the mobile frame is controlled, usually, by one or several hydraulic jacks, it has been suggested, in the document U.S. Pat. No. 3,528,340, to control their action, in a semi-automatic process, by means of a distributor controlled by a cam having parabolic profile enabling to increase gradually the speed of the mobile dies during the flash welding step, until the speed necessary to forging has been reached.

However, this closing-in should not be too rapid, otherwise, it might cause a high short-circuit capable of suppressing the flash welding phenomenon.

The profile of the cam must therefore be adapted to the nature and to the dimensions, in particular the thickness, of the parts to be welded and may be determined, for instance, by tests.

To change the programme of manufacture, a new cam must therefore be used, having a profile adapted to the features of the new product.

Still, for a certain time, the customers' needs are more and more variegated and it is not easy to have a sufficient number of cams in order to meet all these demands.

Moreover, the cams are set for certain welding conditions and it is not possible, this way, to take into account, for each part, and for each instant, the actual conditions wherein the parts are heated and forged.

It is therefore the own experience of the operator and new tests which enable to match the needs, but, to do so, relatively long time is required.

According to another method, so-called 'by successive closing-in steps" method, the welding current is measured and the travel of the mobile frame is controlled during the flash welding process, in order to maintain the measured value of the current between two predetermined values in order to avoid, on the one hand, the interruption of the flash welding process and, on the other hand, any short-circuit. In the method described, for instance in the document EP-A-0 413 821, the travel is stopped when the measured current reaches a predetermined value and the parts to be welded are subject to an oscillatory movement, at a frequency ranging between 10 and 50 Hz.

However, such a method does not enable to take into account all the physical phenomena which take place during the welding process.

The invention intends to solve all these problems thanks to a new method enabling to control automatically the travel of the mobile frame in order to perform the welding under the best conditions while taking into account, not only the structural and dimensional features of the parts to be welded but also the actual values, at any moment, of the electric welding parameters.

Moreover, the invention enables to control the positions and the relative movements of the parts to be welded, not only during the flash welding step but also during the forging and even after forging.

Indeed, by the position control of the dies, the invention allows a control of optimal conditions for weld solidification, weld trimming and weld annealing.

It should be noted, that the method according to the invention is particularly advantageous for continuous line production plants of metal bands which imply the butt welding of coiled bands whereof the features may vary in relation to the programme of manufacture.

Indeed, in such plants, a rupture of the welding, for instance during the rolling process, causes a production dead time which is detrimental economically. It is therefore particularly interesting, thanks to the invention, to improve the quality of the weld, while adapting automatically the welding conditions to the features of the sheet metals to be welded.

Besides, welding between two successive bands requires to stop the band from running. In continuous line plants, it is therefore necessary to provide large accumulators allowing the running of the band in other sections of the line during the time necessary to welding.

The arrangements according to the invention enable to reduce the duration of a welding cycle and, thus, to decrease the importance of the necessary accumulators.

The invention applies therefore, generally speaking, to a flash welding machine of the type comprising a fixed frame and a longitudinally travelling mobile frame, each [2]carrying each a pair of clamping dies, respectively of both parts to be welded and means for relative travel of both frames, towards one another, whereas both pairs of dies are connected to an electric power supply source for the flow of a welding current after said ends have contacted one another.

According to the invention, on the one hand, the value of a set of electric parameters including at least the voltage and the intensity of the welding current and on the other hand the relative position of the mobile frame with respect to the fixed frame are determined at any moment and the travel of the mobile frame is regulated in position from at least one of said instant values, in order to control the closing-in speed of the ends of both parts taking in account the progress of the welding process, during at least a portion thereof.

Normally, the welding is performed in two successive steps, respectively a first flash welding step for heating the ends in contact at a welding temperature, by producing a series of electric micro-contacts with projection of sparks along said ends, and a second forging step with mutual engagement of the heated ends over a forging length According to the invention, during the first flash welding step, the travel position of the mobile frame towards the fixed frame is slaved to the measurement of at least one of the electric welding parameters, while controlling the travel speed of the mobile frame according to a law determined in relation to the structural and dimensional features of the parts to be welded, in order, on the one hand, to increase the welding intensity as the temperature rises, while increasing gradually the closing-in rate and, on the other hand, to limit the closing-in rate to avoid a short-circuit.

To this end, and in a particularly advantageous way, the travel speed of the mobile frame is controlled according to a mathematical law summing three terms, respectively, a first term corresponding to a basic speed of the mobile frame proportional to the welding voltage, a second term of limitation of the travel speed relative to the progress of the welding voltage, to avoid any risk of short-circuit and a third term obtained by comparison of the measured value at each instant of the intensity of the welding current with a reference intensity depending on the features of the parts to be welded, to increase said intensity while accelerating the travel as the temperature rises.

In a preferred embodiment, the control law of the travel speed has the following form $$v(t) = VKU_s + S(KU_s - U_p) + \Gamma \int (I_{ref} - I_s) dt \quad (1)$$

wherein:

v(t) is the instant speed of the mobile die $VKU_s$ is a basic speed proportional to the welding voltage S is a sensitivity coefficient enabling to modulate the speed correction K is the transformation ratio between a primary feeding circuit and the secondary welding circuit $U_s$ is the secondary welding voltage, measured at any moment $U_p$ is the primary feeding voltage $I_s$ is the measured value, at any moment, of the intensity of the welding current $I_{ref}$ is a reference value of the intensity of the welding current, depending on the parts to be welded $\Gamma$ is a regulation gain of the acceleration.

According to another advantageous feature, during the second forging step, the position of the travel of the mobile frame is regulated in order to command hydraulically and without any risk of rebound, the gradual stopping of the mobile frame after bringing the dies closer to one another over the forging length.

Preferably, for forging, the closing-in of the mobile dies towards the fixed dies is initiated, in a very short time, at a travel speed which is controlled according to a continuous variation law comprising a sudden acceleration followed by a gradual slowing-down until the mobile dies have stopped in a position corresponding to a predetermined forging length.

The invention also covers a device for controlling the operation of a flash welding machine comprising:

means for continuous measurement of a set of electric welding parameters including at least the voltage and the intensity of the welding current flowing between both pairs of dies, measuring means, for each instant, of the relative position of the mobile dies with respect to the fixed die, position regulation means of the travel of the mobile frame from at least one of the measurements taken, with real-time control of the closing-in speed of the ends of both parts.

The displacement means of the mobile frame with respect to the fixed frame comprising at least one hydraulic jack associated with a power supply circuit, the operation of said jack is controlled by an adjustment member of the hydraulic flow rate controlled by a regulator according to at least one dynamic law according to the progress of the welding process.

In a particularly advantageous fashion, the regulator includes a calculation unit wherein is stored at least one relative displacement law of the parts to be welded taking into account the structural and dimensional features thereof, said calculation unit receiving signals representative, on the one hand of the position, at any moment, of the mobile frame with respect to the fixed frame and, on the other hand, of the real time progress of at least one of the electric welding parameters.

In a preferred embodiment, the regulator is associated with two closed cascade regulation loops, respectively a primary regulation loop of the relative position of the mobile frame and a main loop for setting a position reference, taking in account the progress of at least one of the electric welding parameters, according to at least one dynamic displacement law stored in the calculation unit.

Besides, the position control means, according to the invention, of the travels of the mobile frame, enable to control the solidification conditions of the weld, to obtain an optimal temperature for trimming and even, if necessary, to perform an annealing operation between the dies upon completion of the planning operation, in order to ensure post-treatment of the weld.

But the invention also covers other advantageous features which will appear in the following description of a particular embodiment, given solely for exemplification purposes and illustrated by the appended drawings.

BRIEF DESCRIPTION OF THE DRAWINGS

FIG. 1 represents very schematically a whole butt flash welding machine comprising a fixed frame 1 and a mobile frame 1' between which runs a metal band carried by roller tables, not represented, which delineate a substantially horizontal running plane.

Figure 1:
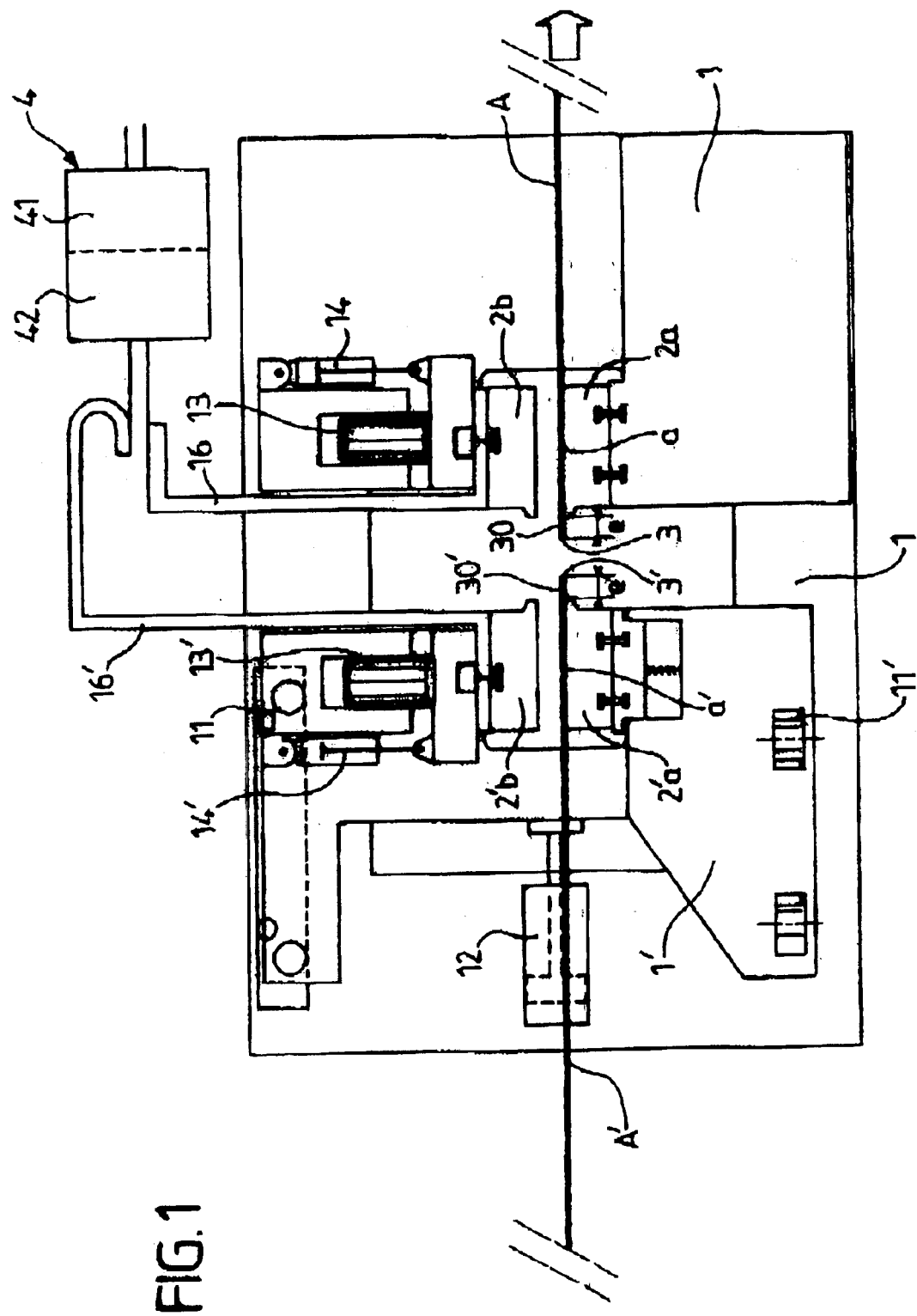
FIG. 1 is a longitudinal sectional schematic view of a flash welding machine.

To maintain continuous running, the rear end, in the running direction, of a first band A must be butt welded on the front end of a second band A'. To this aim, the running is stopped and both bands are placed in the position represented on FIG. 1.

In the embodiment represented, the mobile frame 1' is moveable by translation and, to this aim, it is carried by suspension rollers 11 with horizontal axes and guided laterally by rollers 11' with vertical axes, in order to slide parallel to the longitudinal running axis of the bands A, A', under the action of two hydraulic jacks 12 whereof the body is attached to the fixed frame 1 and whereof the stems rests on the mobile frame 1', whereas said jacks are placed on either side of the band and operate synchronously. Obviously, also a single jack placed in the longitudinal median plane of the machine could be used.

On the fixed frame 1 is installed a clamping chuck comprising a pair of dies, respectively a lower die 2a whereof the lower portion is placed substantially in the horizontal running plane P of the bands A, A' and an upper die 2b which may move vertically under the action of at least one clamping jack 13. The jack 13 may be a single stroke jack, whereas the upper die 2b is raised by one or two jacks 14 which enable to maintain the chuck 2 open for the passage and the positioning of the band A.

Similarly, the mobile frame 1' carries a chuck 2' constituted of two clamping dies actuated by clamping jacks 13' and lifting jacks 14'.

Generally speaking, such a machine may be incorporated to a treatment plant for metal bands which run, along the plan P, between the dies of both chucks 2, 2', whereas said chucks are held open, in normal operation, by the jacks 14, 14'.

If two successive bands must be welded, the running of the first band A is stopped first of all and the chuck 2 is clamped onto the rear portion (a) thereof, then a rear edge 3 is cut perfectly rectilinear by means of shears, not represented.

Similarly, the second band A' is fed in and, after clamping its front portion (a'), between the dies of the mobile chuck 2', front edge 3' is cut perfectly parallel to the rear edge 3 of the first band A.

Both bands A, A' are positioned with precision in order to adjust remotely a cantilever distance, respectively e, e' between each shorn edge 3, 3' and the end of the dies of the corresponding chuck 2, 2'. Both chucks 2, 2' are then clamped onto the portions a, a' of both bands A, A'.

The cantilever lengths may be adjusted after shearing, by means of a calibrated wedge, but it could be also possible to shear both bands and adjust simultaneously the cantilever distance, in the way indicated in the French patent n° 2756504 mentioned already. After adjusting and clamping both chucks 2, 2', the jack 12 is actuated in order to cause the mobile frame 1' to move forward and thereby bring in contact the opposite edges 3, 3' of both bands A, A' held clamped between the chucks 2, 2'.

The dies of both two chucks 2, 2' are made of conductive copper and are connected to both poles of the electric current source 5. Both bands A, A' are thus energised during the flash welding step which, as indicated above, causes high temperature heating of the cantilever ends 30, 30' of both bands, close to both contacting edges 3, 3'.

Generally speaking, the electric current source comprises a transformer E having a primary winding 14 connected to the distribution network and a secondary winding 15 connected to the dies of both chucks 2, 2', respectively by a set of basr 16, 16'.

The invention may be applied to any type of flash welding machine which may be fed by alternate or direct current.

However, as hereunder indicated, feeding by a modulated direct current, as described in the U.S. Pat. No. 6,429,398 of the same company, would be particularly advantageous for using the invention.

In such a case, the transformer is associated with a rectifier and continuously modulating means of the voltage applied between the chucks 2, 2', taking in account the nature of the metal and the dimensions of the pieces to be welded.

Besides structure and working of such a flash welding machine are described in detail in the French patent n° 2756504 which may be referred to in case of need.

Figure 2:
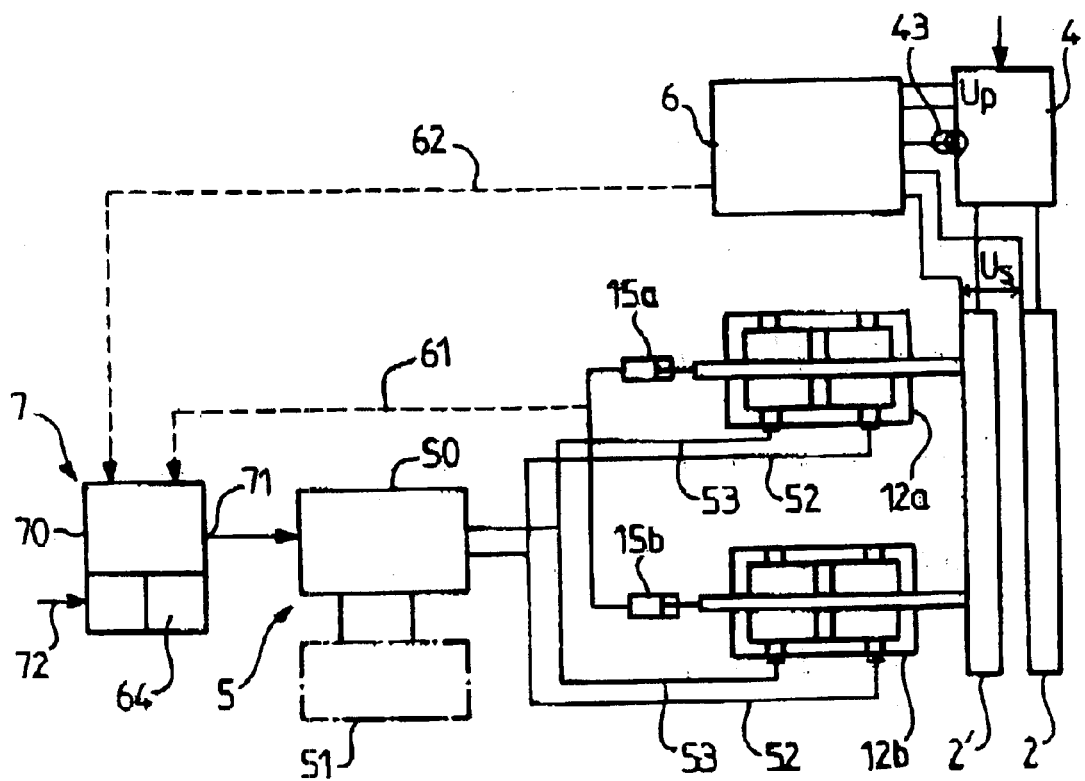
FIG. 2 is a diagram of the digital regulation device for controlling the travel of the mobile dies.
Figure 3:
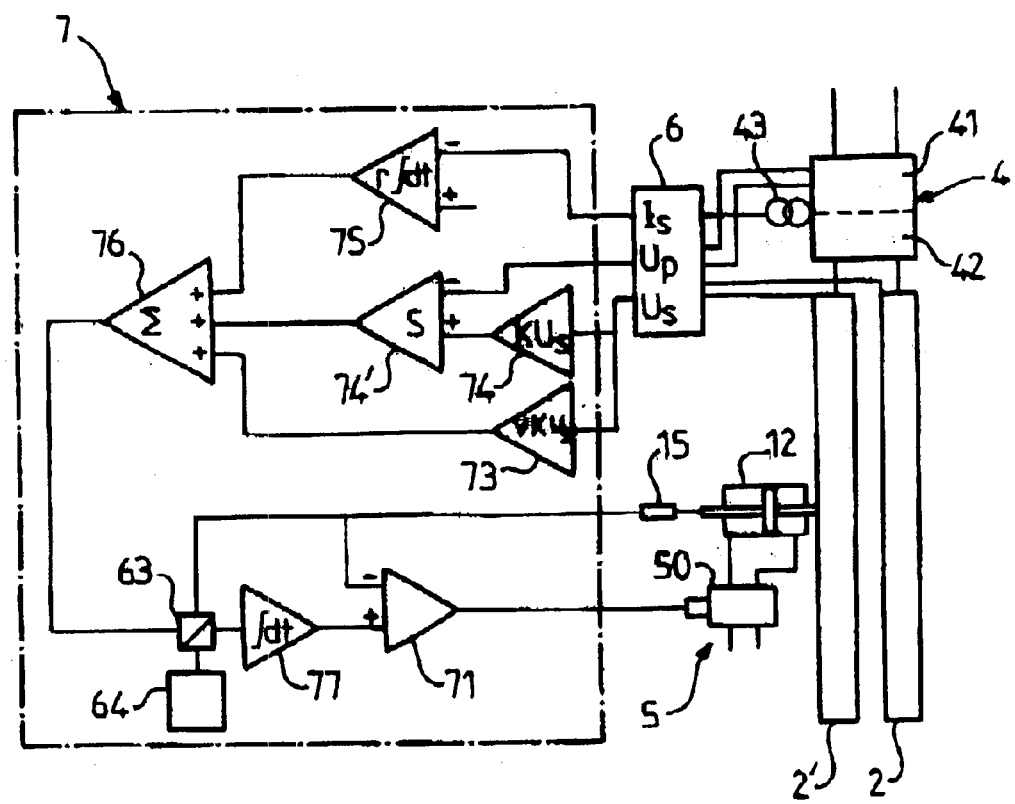
FIG. 3 is an equivalent analogue diagram.

According to the invention, the travel of the mobile frame is controlled by a position closed loop as represented schematically on FIGS. 2 and 3.

In the embodiment represented, the travel of the mobile chuck 2' with respect to the fixed chuck 2 is controlled by two double-stroke hydraulic jacks 12a, 12b, fed from a hydraulic plant 51 by a hydraulic circuit 5 comprising a member for adjusting the supply rate of the jacks such as a servo-valve 50 connected to both chambers of each jack 12a, 12b by piping sections 52, 53 of equal length in order to guarantee synchronous travel of both jacks 12a, 12b.

Both jacks 12a, 12b are associated, respectively, with two position transducers 15a, 15b which emit a signal representative of the relative position, at any moment, of the mobile dies 2' with respect to the fixed dies 2.

As above indicated, both pairs of dies 2, 2' are connected respectively, by conductive bars 16, 16', to both terminals of a power generator such as transformer 4 comprising a primary circuit 41 and a secondary circuit 42.

A set of transducers 6 measures the electric parameters of the welding process and, in particular, the intensity is and the voltage $U_s$ of the electric current flowing between the dies 2, 2' and the supply voltage $U_p$ of the power generator 4.

Preferably, the voltage of the welding current $U_s$ is measured directly on the welding dies 2, 2' by means of sockets fixed to their ends and not on the conductive bars 16, 16' of the power supply.

In a known fashion, the intensity is in the power supply circuit of the dies, may be measured by means of an intensity transformer 43.

The corresponding measuring signals, emitted by the transducers 6, are displayed on an electronic control assembly forming a regulator 7 comprising a calculation unit 70 associated with two cascade regulation loops, respectively a primary closed loop 61 for position control and a main closed loop 62 for setting a position reference taking into account the operation of the welding process.

The calculation unit 70 is programmed in order to set, from the measuring signals thus received and in relation to the features of the parts to be welded, a speed reference which is integrated to provide a position reference. Said reference is compared with the instant position measurement provided by the primary loop 61 in order to prepare, at the output 71 of the regulator, a control signal of the servo-valve 50 for position control of travel of the mobile dies 2'.

This speed reference is prepared in two different ways for each step of the method, respectively heating step and forging step, taking in account the structural and dimensional features of both parts to be welded A, A' which are displayed, before starting the welding process, at an input 72 of the regulator, either manually, by means of a keyboard or any other means available to the operator, or from another production management calculator, in particular in the case of a continuous treatment plant of metal bands.

The regulation techniques, in particular digital techniques, are well known and do not require a detailed description. For exemplification purposes, FIG. 3 provides the analogue equivalent of a regulator 7 for implementing the invention.

The electric power supply of the fixed 2 and mobile 2' dies is provided, usually, by a transformer 4 having a primary circuit 41 and a secondary circuit 42 with a transformation ratio K.

As indicated above, the invention may be applied to a machine which is fed by alternate or direct current. However, considering that the regulation is performed from measures of electrical parameters, a feeding by modulated direct current, as described in the U.S. Pat. No. 6,429,398 would be particularly advantageous because it would be thus possible to eliminate the self-induction part coming from the network frequency and, thus, to take into account only the variations in connection with the flashing phenomena, thus avoiding in the measures influences due to inductance phenomena in relation with the frequency of the feeding network.

During the flash welding step, which serves for heating the ends 30, 30' of both parts, the primary feeding voltage $U_p$, the secondary voltage of the welding current $U_s$ and its intensity $I_s$ are measured by a set of electric transducers 6 and the corresponding signals are injected, through the main regulation loop 62, in a regulator 7 whereon are displayed, on the other hand, the structural and dimensional features of the parts to be welded.

The calculation unit 70 is programmed in order to prepare, from this set of data, the different terms of the displacement law enabling to set a reference order for the primary position regulation loop 61.

As above indicated, first of all, in a known fashion, the lengths e, e' of the cantilever portions 30, 30' of both bands A, A' are adjusted, then the dies are clamped on both bands, and then put under voltage. The servo-valve 50 controls the power supply of the jacks 12 and the mobile frame starts to move towards the fixed frame 1 at a speed which, generally speaking, is proportional to the secondary voltage and may therefore be expressed as $VKU_s$.

This first term of the displacement law (1) is prepared by an amplifier 73 whereon is applied the signal corresponding to the secondary voltage $U_s$ and which determines a basic speed $VKU_s$ for the travel of the mobile frame.

Generally speaking, the instant value of the secondary voltage $U_s$ ranges, permanently, between the empty voltage UV and the short-circuit voltage $U_0$.

Indeed, when starting up, when the dies 2, 2' are energised, the opposite edges 3, 3' of both bands are moved apart and the secondary voltage $U_s$ is equal to the empty voltage $U_v$.

Conversely, if the edges of the sheet metals 3, 3' are applied over their whole length, a short-circuit happens.

There is therefore, permanently:

$$U_v \geq U_s \geq U_0 \qquad (2)$$

As indicated, the principle of flash welding consists in bringing closer the sheet metals so that, taking into account the inevitable irregularities of the shorn edges 3, 3', a series of short-circuit bridges is generated with projection of sparks, thereby heating the ends 30, 30'.

The sparks thus ejected outside the contact zone draw a portion of the metal which must be compensated for in order to keep the edges 3, 3' sufficiently in contact for maintaining formation of the short-circuit bridges necessary to heating. During the flash welding step, a certain closing-in rate of the mobile frame 1' towards the fixed frame 1 must be maintained.

However, this speed must also be limited to prevent both edges 3, 3' from being applied onto one another, over their whole length, which might cause high short-circuit.

According to the invention, the regulator 7 controls the closing-in of the mobile dies 2' towards the fixed dies 2 by adhering to a displacement law which enables to keep a contact just sufficient for heating, while avoiding total short-circuit.

This result is obtained by using the welding voltage as main parameter.

Indeed, if the opposite edges 3, 3' are too far apart, the value of the secondary voltage $U_s$ comes close to the empty value $U_v$ and the heating may be insufficient or, even, nil. The closing-in speed must therefore be increased to maintain sufficient distribution of the micro-contacts.

Conversely, if the edges 3, 3' are too close, the secondary voltage $U_s$ comes close to the short-circuit voltage $U_0$ and the travel of the mobile dies 2' must be slowed down before complete contact.

To do so, according to the diagram of FIG. 3, the value of the secondary voltage $U_s$, multiplied by the transformation ratio K, for instance by means of an amplifier 74, is compared with the primary voltage $U_p$ in a comparator 74' which prepares a correction signal of the travel speed, while taking into account a coefficient sensitivity S enabling to modulate this correction in order to avoid jerky movements.

It should be noted that, in such a way, the value of the primary voltage $U_p$ is taken as reference and the regulation cannot be influenced by a value variation in voltage of the power supply network.

However, due to the thermal inertia of the clamping dies 2, 2', the calories produced by the short-circuit bridges are evacuated, partially, behind the edges in contact and this thermal loss is proportional to the temperature. Should the closing-in speed remain constant during the flash welding process, then the sheet metals would therefore be heated solely along the edges in contact 3, 3', and the cantilever portions 30, 30' would not reach sufficient temperature for the requested forging effect.

It is therefore necessary to compensate for these losses while increasing the heating power and, consequently, the intensity, as the temperature rises, but while remaining however under the short-circuit value.

However, during heating, the secondary voltage $U_s$ which is equal to the product of the intensity by the resistance, has to be maintained substantially constant. Thus, such increasing in the intensity and, consequently, in the heating power, will be obtained, according to the invention, while increasing the closing-in speed of the edges in contact 3, 3', and, consequently, the number of spark formation points, which reduces the apparent contact resistance of both sheet metals.

Generally speaking, as the contact resistance depends on the nature and the sizes of the parts to be welded, it is possible, for instance after preliminary testing, to set a variation profile of the intensity during the flash welding process, defined by a reference intensity $I_{ref}$ and a variation ratio. By difference with the instant value $I_s$ of intensity, an acceleration term may be then calculated enabling to come closer to the current to be reached at any moment.

In the equivalent embodiment, illustrated by FIG. 3, the difference ($I_{ref}$–$I_s$) thus measured is integrated by an operational amplifier 75 with a gain $\Gamma$ enabling, on the one hand to take into account the nature of the parts to be welded and, on the other hand, to modulate the effect of the acceleration term thus obtained on the global variation of the travel speed.

During the flash welding step, the regulator 7 prepares therefore the three terms of the displacement law enabling to vary the instant speed v(t) according to the formula:

$$v(t)=VKU_s+S(KU_s-U_p)+\Gamma(I_{ref}-I_s)dt \qquad (1)$$

wherein:

v(t) is the instant speed of the mobile dies $VKU_s$ is a basic speed proportional to the welding voltage S is a sensitivity coefficient enabling to modulate the speed correction K is the transformation ratio between the primary feeding circuit and the secondary welding circuit $U_s$ is the secondary voltage circuit, measured at any moment $U_p$ is the primary feeding voltage $I_s$ is the measured value, at any moment, of the intensity of the welding current $I_{ref}$ is a reference value of the intensity of the welding current, depending on the parts to be welded $\Gamma$ is a regulation gain.

As indicated, FIG. 3 provides an analogue equivalent enabling to analyse the regulation principle but it is interesting to use a digital regulation enabling to fulfil the same functions while adhering, preferably, to the dynamic displacement law (1) given above.

When starting up, when the ends 3, 3' of both sheet metals are moved apart, the secondary voltage $U_s$ is equal to the empty voltage $U_v$, itself proportional to the primary voltage $U_p$ in the transformation ratio K.

Then, the regulator 7 determines a basic speed $VKU_s$ which is gradually accelerated according to the third term of the equation, in order to increase the heating energy but while maintaining the secondary voltage $U_s$ substantially constant or, at least, in a determined interval, thanks to, the second term of the equation.

Preferably, the acceleration term comes into play only after a priming step to provide homogeneous heating over the whole width of the band.

As can be seen on the equivalent diagram of FIG. 3, the signals corresponding to the three terms of the equation (1), prepared as indicated above, are treated by a summing integrator 76 which emits a control signal of the speed v(t).

An integrator 77 enables to prepare the position reference of the mobile chuck 2' calculated in relation to the instant speed v(t) thus calculated and to the initial position $y_0$ of the mobile chuck 2', according to the equation:

$$y=y_0+\int V(t) \qquad (3)$$

This position reference is displayed on a comparator 71 which, by the primary regulation loop 61, receives the instant position signal emitted by the transducer(s) 15 and, while adhering to the dynamic displacement law (1), prepares the control signal of the servo-valve 50 in order to control the travel of the mobile dies 2' at the speed thus determined.

As indicated, the gains V, K, S, of the different members of the regulator 7, as well as the reference intensity $I^{ref}$ are determined, for instance by tests, in relation to the parts to be welded.

However, the number of tests necessary to cover a range of production may be limited since the regulation system according to the invention enables easily to optimise the adjustments for other formats of sheet metals and other types of steel.

Indeed, since the regulation control parameters are electric values, new reference values in relation to the electric features of the material to be welded may be determined, on the basis of the adjustments provided for a certain type of sheet metals, and the same goes in case of dimensional changes.

Since the electric parameters which determine the heating up process are controlled permanently, the welding may be performed under the best possible conditions, while determining, for each case, an optimal variation profile of the closing-in speed and, consequently, of the welding intensity. It is thus possible to reduce to a minimum the flash welding time without affecting the welding quality.

Figure 4:
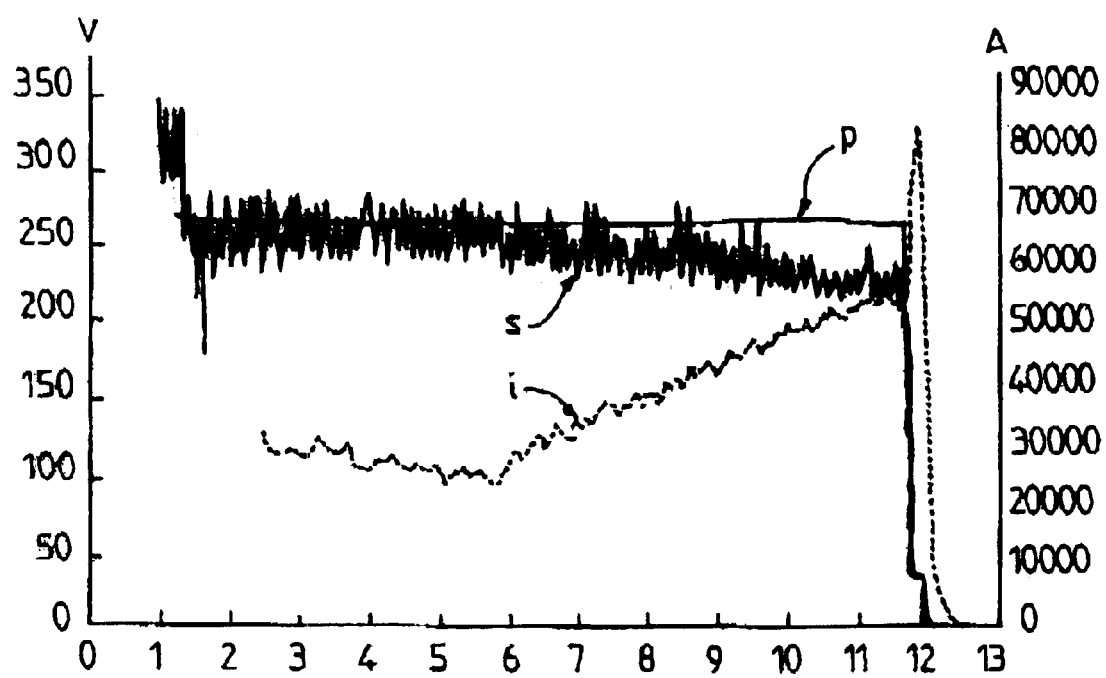
FIG. 4 represents a record of the main electric welding parameters during the flash welding step.

For exemplification purposes, FIG. 4 shows the embodiment of a welding with a flash welding duration of approximately 10 seconds.

FIG. 4 is a double diagram showing the variations, in relation to the time specified in abscissa, of the voltages specified in volts on the left-hand scale and of the welding intensity indicated in Amperes on the right-hand scale.

The curve (p) represents the variation of the primary voltage $U_p$ which remains substantially constant during the whole flash welding step and descends abruptly, by reason of the short-circuit, when the sheet metals are applied towards one another for forging, i.e. around the 12th second.

The curve (s) represents the variation, with the course of time, of the value $KU_s$ of the secondary voltage taking into account the transformation coefficient and shows that this value undergoes a certain fluctuation because of the relative instability of the flash welding phenomenon but varies, however, around an average value that is substantially constant throughout the flash welding step, i.e. until the 11th second.

The curve (i), which is represented by spaced points on FIG. 4, shows that the secondary intensity is increases rapidly during more than half the flash welding stroke whereas, as can be seen, the secondary voltage remains substantially constant. This means that the short-circuit has been avoided while accelerating the travel of the mobile dies in order to increase the heating power.

During forging, i.e. at the 12th second, the intensity grows abruptly at short-circuit, then decreases and disappears together with the voltage.

However, after performing the forging stroke, it is preferable to maintain a small voltage between the dies, in order to control the cooling-down speed of the zone thermally affected until solidification of the metal.

It should be noted that controlling the position, according to the invention, of the mobile frame, enables moreover to control the forging process.

Indeed, inasmuch as the heating has been controlled perfectly during the flash welding step, it is possible to determine the quantity of metal used during this step and the remaining cantilever length necessary to the forging, i.e. the relative position of the mobile dies 2' with respect to the fixed dies 2, from which the rapid closing-in of the fixed dies may be initiated along the forging stroke necessary to mutual engagement of the sheet metals in their heated portion.

A switch 63 placed upstream of the integrator 77 and controlled by the position transducer 15 enables, at the end of the stroke foreseen for the flash welding process, to initiate a sudden acceleration, for forging, of the mobile frame 1', while following a speed variation profile which is determined by a generator 64.

Figure 5:
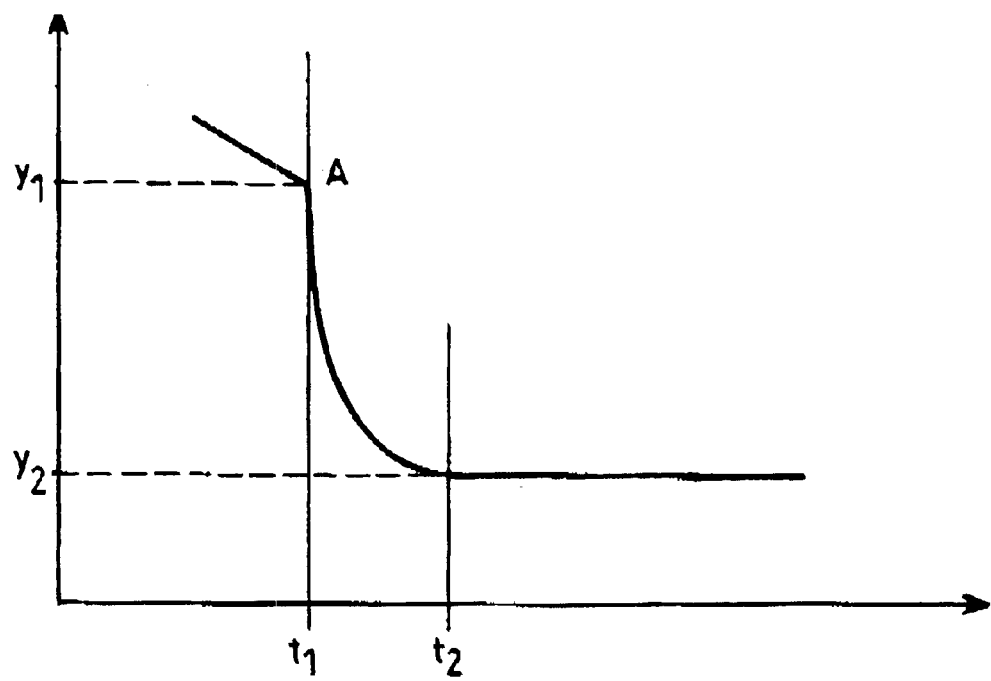
FIG. 5 is a space/time diagram showing the travel of the mobile dies during the forging step.

This speed variation profile is of the type represented, for exemplification purposes, on FIG. 5 which shows the variation, in relation to the time specified in abscissa, of the position of the mobile dies 2' indicated in ordinate.

As indicated above, slaving the mobile frame 2' by means of the regulator 7 enables to stop the flash welding process at an instant $(t_1)$ in a position $(y_1)$ of the mobile frame for which, after consumption of the metal in the flash welding step, the remaining cantilever length is at least equal to the forging stroke necessary.

From this instant $(t_1)$, the programme stored in the generator 64 determines a sudden acceleration of the travel of the mobile frame, followed by gradual braking whereas the mobile frame stops in the position $(y_2)$ for which the travel speed is nil.

Thus, throughout the forging stroke which is equal to the difference $(y_1-y_2)$, the travel of the mobile dies 2' is managed by real time calculation of the position reference in order to follow a space/time trajectory of the type represented on FIG. 5.

II is thus possible to send first of all the highest possible power into the jack 12 in order to accelerate the travel of the mobile dies 2' to the maximum and, in spite of the very high inertia of the mobile frame 1' which may have a mass of 50 to 100 tons, to perform the forging in an extremely short time $(t_2-t_1)$, for instance 150 mil/seconds, while braking the travel gradually in order to perform exactly the forging stroke $(y_1-y_2)$ requested.

This accurate and precise braking step enables to avoid the shortcomings of known machines, wherein the travel of the mobile frame must be stopped by a mechanical limit stop which may, by rebound, cause a slight recall motion of the mobile die, detrimental to the quality of the weld during solidification.

In the invention, conversely, the position control of the travel of the mobile frame plays the part of a hydraulic limit stop with a shock absorbing effect, while avoiding any risk of rebound.

Besides, simultaneous control of the position of the mobile dies and of the progress of the electric parameters enables to control the distance between the mobile and the fixed chucks 2, 2' during the time necessary to the solidification of the weld and, during this time, to circulate a short-circuit current between the parts A, A' in order to perform, by Joule effect, a controlled cooling of the zone thermally affected by the welding. Thus, the invention provides a weld having optimal qualities in conditions which are adapted to the grade of the material to be welded.

If needed, additional air spray cooling-down enables to obtain, at the end of cycle, optimum temperature for the next operation.

Indeed, this type of welding causes the formation of a flange which must be planed off, for instance as described in the French patent n°2756504 already mentioned, and it is useful to obtain rapidly by a controlled cooling of the weld, a temperature for which this operation is performed more easily and more quickly.

Moreover, the device according to the invention enables easily to control all the displacements of the mobile frame while applying references typical of the positions which the mobile die must occupy in order to perform certain particular steps of the machine cycle, whereas each position can be reached from the previous position while controlling the programmed displacement speed, according to the equation (3) above.

Consequently, it should be noted that, even if the invention is provided essentially to control the travel of the mobile frame during the flash welding and forging steps, such a position control is also advantageous for the other steps of the connection process of two successive bands, each time it is necessary to perform accurate positioning of the clamping chucks 2, 2' and both bands, for instance for shearing their ends, adjusting the cantilever lengths and planing off the welding flange.

Indeed, as indicated above, the cantilever distances e, e' must be limited and are simply sufficient to enable the flash welding process and the forging operation. The position control of the mobile frame enables, at the end of the welding cycle properly speaking, to move the mobile dies back over the distance just necessary to let through the planing tool which may, advantageously, be guided over the fixed frame, as described in the patent FR-2756504 mentioned already.

Moreover, it has appeared that the possibility of controlling, according to the invention, the relative travels of the clamping dies, might still exhibit other advantages.

It is known, indeed, that it is sometimes well-advised, after the welding of two successive bands, to subject the zone thermally affected to a thermal treatment, such as an annealing operation.

It is the case, notably of certain alloys exhibiting risks of brittleness, such as steels having a high content in carbon, silicium, magnesium, etc. . . .

Besides, certain very highly resilient steels, in particular so-called <<TRIP>> steels, require such a thermal treatment.

Until now, to anneal the weld, the welding machine had to be associated with an appended device constituted, for instance, of an electric induction furnace. Such an arrangement involves a significant investment and, moreover, requires the transfer, after welding, of the welded portion, into said induction furnace which is placed on the path of the band, at a certain distance downstream of the welding machine.

In a line treatment plant, the means controlling the running of the band must therefore be used, after the welding and the planning operations, to feed the welded zone forward to the furnace, and then the running has to be stopped again to proceed to the thermal treatment. The global stoppage time of the band is therefore increased considerably and may even double, since the annealing time is practically of the same order of magnitude as the time necessary to the welding operation.

Still, it has appeared that, thanks to the invention, it would be possible to avoid such travels of the band and, consequently, to improve the throughput of the plant while performing the annealing treatment inside the welding machine, which enables, on the one hand, to dispense with one furnace and, on the other hand, to reduce considerably the stoppage time of the band.

Indeed, it has been noted that, thanks to the electric power available on the machine for the welding operation and to the possibility of controlling the cooling-down as indicated above, it would be possible to perform an efficient annealing treatment of the welded zone, whereas the necessary heating-up is generated by a Joule effect while letting the electric power flow, in short-circuit, through the band, by means of the dies.

To obtain a temperature rise which is high and quick enough of the welded zone, it is necessary, however, to move apart as much as possible thereof both dies which are used for transmitting the current but are massive parts capable of absorbing an important portion of the heat generated. The position control, according to the invention, enables to perform such an operation each time the nature of the welded metal justifies an annealing post-treatment. The invention enabling therefore to add an annealing cycle, to the flash welding, forging and planing steps described previously.

As indicated in the patent FR-2756504 mentioned already, during the planning operation, both pairs of dies are clamped in order to maintain the welded zone but it is advantageous that the planing tool is guided on the fixed frame, the weld being, therefore, very close to the fixed dies.

Upon completion of the planing, the fixed dies will be loosened while the mobile dies will remain tight and the mobile frame will be moved back over a distance corresponding to approximately half the value of the maximum opening of the machine. The welded portion, which is drawn backwards by the mobile dies, moves away therefore from the, fixed dies over this distance.

The fixed dies 2a, 2b are then tightened on the upstream band A situated in this position and the mobile dies 2'a, 2'b are loosened, then the machine is opened to the maximum while moving backward the mobile frame 1' still further and the mobile dies 2'a, 2'b are tightened on the downstream band A'. Thus, the weld has been placed substantially in the middle of the distance between both pairs of dies 2, 2' which are then moved apart to the maximum, which enables to limit the thermal losses by conduction through the dies when said dies are fed to let the current flow.

Thus anneal the welded zone which is heated by a Joule effect of the current flowing between the dies may be annealed, whereas said current can be modulated thanks to the control devices of the electric power wherewith the machine is necessarily equipped for controlling the flash welding process. It is thus possible to modulate the effect of the current in delivered intensity and in the course of time while taking into account the nature of the welded metal, in order to perform the annealing effect requested, by a sufficient and sufficiently rapid heating and then controlled cooling-down.

The invention enables therefore, without modification of the machine and without adding an induction furnace, to perform annealing post-treatment of the weld each time the nature of the metal justifies so, while simply adding this annealing cycle to the flash welding, forging and planing steps which are performed in a classical machine.

It should be noted, besides, that this additional annealing sequence will be even more efficient and easier to be controlled if the welding machine is fed by a variable direct current, as described in the U.S. Pat. No. 6,429,398 mentioned above. Direct current power supply enables indeed, to deliver an instant power which is much higher and easily variable by a thyristor device as described in this prior art and enabling thus, on the one hand to heat the welded zone almost instantly and, on the other hand to control the cooling-down.

The invention enables thus to obtain a weld having optimum features for all the following operations and to ensure; correct unwinding of the bands connected, including during a rolling operation, in the case when the welding machine equips a continuous rolling line.

Obviously, the invention is not limited to the details of the embodiment which has just been described simply for exemplification purpose, but also covers, conversely, all the variations or the improvements remaining within the scope of projection defined by the claims.

For example, if it is advantageous to use digital regulation while following the displacement law indicated above, other displacement laws adapted, for instance, to certain types of materials could, obviously, be defined. Moreover, other regulation means, for instance analogue regulation of the type indicated schematically, by equivalence, on FIG. 3 could be used, whereas the user can choose, for implementing the invention, the electronic or hydraulic components best adapted, to the types of machines used for the welding.

Besides, the invention has been described for the case of metal bands and of a welding machine of the type described in the French patent n°2756504 mentioned already, but it may obviously apply to other pieces to be welded and to any other type of flash welding machine with relative travel of the ends towards one another of both parts to be welded.

The reference signs inserted after the technical features mentioned in the claims solely aim at facilitating the understanding of the said and do not limit their extent whatsoever.

What is claimed is:

1. Method for controlling the butt welding process, by flash welding, of two metallic parts arranged after one another along a longitudinal running axis, in a welding machine of the type comprising two pairs of clamping dies mounted respectively on a fixed frame and on a mobile frame moveable with respect to the fixed frame, electric welding means comprising an electric power supply source with two poles connected respectively to both pairs of clamping dies, means for controlling the clamping of both pairs of dies, respectively close to a rear end in the running direction, of a first part and close to a front end of a second part, and means for controlling the longitudinal travel of the mobile frame with respect to the fixed frame, for contacting said rear and front ends of both parts and the flow of an electric current with a welding voltage and intensity, a method wherein the travel of the mobile frame is controlled automatically, at least during the flash welding process, wherein the value of a set of electric parameters including at least the voltage and the intensity of the welding current and, the relative position of the mobile frame with respect to the fixed frame are determined at any moment and the travel of the mobile frame, is controlled in position from at least one of the values thus determined, in order to control the relative position and the closing-in speed v(t) of the ends of both parts according to the progress of the welding process, during at least a portion thereof.

2. A control method according to claim 1, wherein the welding is performed in two successive steps, respectively a first flash welding step for heating the ends in contact at a welding temperature, by producing a series of electric micro-contacts with projection of sparks along said ends, and a second forging step with mutual penetration of the heated ends over a forging length, wherein, during the first flash welding step, the travel of the mobile frame towards the fixed frame is slaved in position to the measurement of at least one of the electric welding parameters, while controlling, the travel speed of the mobile frame according to a dynamic law determined in relation to the structural and dimensional features of the parts to be welded, in order to increase the welding intensity as the temperature rises, while increasing gradually the closing-in speed and, to limit the closing-in speed to avoid a short-circuit.

3. A method according to claim 2, wherein, during the flash welding step, the travel speed of the mobile frame is controlled according to a mathematical law summing three terms, respectively, a first term corresponding to a basic speed of the mobile frame proportional to the welding voltage, a second term limiting the travel speed relative to the progress of the welding voltage, to avoid a risk of short-circuit and a third term obtained by comparison of the measured value, at any moment, of the intensity of the welding current with a reference intensity depending on the features of the parts to be welded, to increase said welding intensity while accelerating the travel as the temperature rises.

4. A method according to claim 3, wherein the control law of the travel speed is in the following form $$v(t)=VKU_s+S(KU_s-U_p)+\Gamma\int(I_{ref}-I_s)dt$$

wherein:
v(t) is the instant speed of the mobile die
$VKU_S$ is a basic speed proportional to the welding voltage
S is a sensitivity coefficient enabling to modulate the speed correction
K is the transformation ratio between the primary feeding circuit and the secondary welding circuit
$U_s$ is the secondary voltage circuit, measured at any moment
$U_p$ is the primary feeding voltage
$I_s$ is the measured value, at any moment, of the intensity of the welding current
$I_{ref}$ is the reference value of the intensity of the welding current, depending on the parts to be welded
$\Gamma$ is a regulation gain of the acceleration.

5. A control method according to claim 1, wherein the welding is performed in two successive steps, respectively a first flash welding step for heating the ends in contact at a welding temperature, by producing a series of electric micro-contacts with projection of sparks along said ends, and a second forging step by mutual engagement of the heated ends over a forging length, wherein, during the second forging step, the position of the travel of the mobile frame is regulated in order to command hydraulically and without any risk of rebound, the stopping of the mobile frame after bringing the dies closer over the forging length.

6. A method according to claim 5, wherein, for the second forging step, the closing-in of mobile dies towards fixed dies is initiated, in a very short time, over a stroke determined and at a travel speed controlled according to a continuous variation law comprising a sudden acceleration followed by a gradual slowing-down until the mobile dies are stopped in a position corresponding to a predetermined forging length.

7. A method according to claim 6, wherein, after the forging step, the distance between the dies is controlled in order to avoid any stress in the weld and that, simultaneously, an electric current circulates between the dies, respectively fixed and mobile, clamped on both welded parts, said current being capable of controlling, by a Joule effect, the cooling-down speed of the zone thermally affected until complete solidification thereof.

8. A method according to claim 7, wherein, after solidification of the zone thermally affected, the former is cooled down by injecting air until optimum temperature has been reached for planning the welding.

9. A method according to claim 8, wherein, after planning, the mobile dies (2) are moved away over maximum distance from the fixed dies by placing the welding substantially at equal distance of both pairs of dies and a modulated electric current is fed between the dies in order to initiate, by a Joule effect, annealing of the welded zone, followed by a controlled cooling-down.

10. A method according to claim 9, wherein, after planing the weld, the fixed dies are loosened while maintaining the mobile dies clamped, the mobile frame is moved away over approximately half the possible maximum distance with respect to the fixed frame while driving the welded zone, the fixed dies are clamped and the mobile dies are loosened, the mobile frame is moved away until the possible maximum distance with respect to the fixed frame, the mobile dies are clamped and a modulated electric current is fed between both pairs of dies thus clamped on the welded parts in order to initiate annealing of the welded zone.

11. A method according to one of the previous claims, wherein both pairs of dies are fed with direct current under continuously modulated voltage.

12. A device for controlling the flash butt welding of two metal parts arranged after one another along a longitudinal running axis, in a welding machine of the type comprising two pairs of clamping dies mounted respectively on a fixed frame and on a mobile frame moveable longitudinally with respect to the fixed frame, electric welding means comprising an electric power supply source with two poles connected respectively to both pairs of clamping dies, means for controlling the clamping of both pairs of dies, respectively close to a rear end, in the running direction, of a first part and close to a front end of a second part, and means for controlling the longitudinal travel of the mobile frame with respect to the fixed frame, for bringing closer and contacting said rear and front ends of both parts and the flow of an electric current between said ends, with a welding voltage and intensity, capable of heating and welding said ends in contact, said controlling device comprising:

means (8) for continuous measurement of a set of electric welding parameters including at least the voltage and the intensity of the welding current flowing between both pairs of dies, measuring means, at any moment, of the relative position of the mobile dies with respect to the fixed dies, position regulation means for controlling in position the travel of the mobile frame from at least one of the measurements of the said electric welding parameters, with real-time control of the closing-in speed of the clamping dies of both parts.

13. A control device according to claim 12, wherein the displacement means of the mobile frame with respect to the fixed frame comprise at least one hydraulic jack associated with a power supply circuit, wherein the regulation means comprise at least one hydraulic servo-valve for controlling the hydraulic supply of the displacement control means of the mobile frame and a control regulator of the servo-valve for controlling the displacement of the mobile frame according to at least one dynamic law, in relation to the progress of the welding process.

14. A control device according to claim 13, wherein the regulator comprises a calculation unit wherein is stored at least one relative displacement law of the parts to be welded taking into account the structural and dimensional features thereof, whereas said calculation unit receives signals representative, of the position at any moment of the mobile frame with respect to the fixed frame and, of the real time progress of at least one of the electric welding parameters.

15. A control device according to claim 14, wherein the regulator is associated with two closed cascade control loops, respectively a primary control loop of the relative position of the mobile frame and a main loop for setting a position reference taking into account the progress of at least one of the electric welding parameters according to at least one dynamic displacement law stored in the calculation unit.

16. A control device according to one of the claims 12 to 15, wherein the welding machine is fed with direct electric current through a transformer associated with a rectifier and continuous modulation means of the voltage applied between two pairs of dies taking into account the nature of the metal and the sizes of the bands to be welded.

* * * * *